Oct. 20, 1953 J. J. MITNICK 2,655,862
FRUIT JUICE EXTRACTOR
Filed July 17, 1948 2 Sheets-Sheet 1

Inventor
Jacob Jud Mitnick
By J. Irving Silverman
Attorney

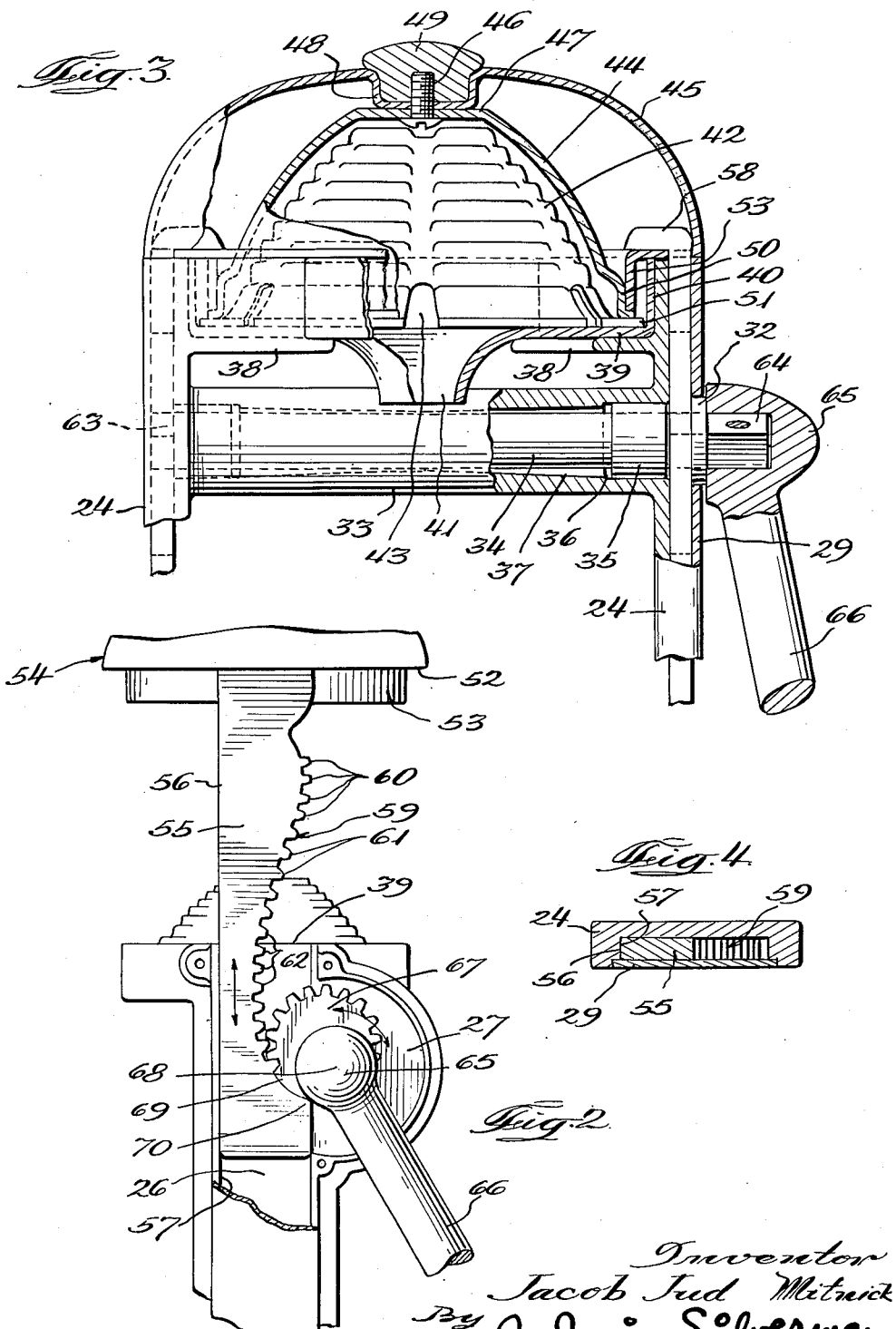

Patented Oct. 20, 1953

2,655,862

UNITED STATES PATENT OFFICE 2,655,862

FRUIT JUICE EXTRACTOR

Jacob Jud Mitnick, Chicago, Ill.

Application July 17, 1948, Serial No. 39,242

2 Claims. (Cl. 100—288)

This invention relates generally to fruit juice extractors and more particularly to a small expressing device adapted to be manually operated for use in the home or at refreshment dispensaries.

In a fruit juice extractor of the character here involved, there is provided a stationary part, and a movable part adapted to be forced against the stationary part to express the juice from a piece of fruit placed upon the stationary part. In order to apply considerable force against the fruit for efficiently squeezing the juice therefrom, the ordinary fruit juice extractor is compound acting, that is to say, the pressure applied by means of the movable part is amplified by levers, rack and pinion gear mechanisms, or combinations thereof. For example, the movable part is attached to a rack having a pinion enmeshed therewith, and the pinion is adapted to be rotated by a lever in the form of a handle attached to the pinion shaft.

The mechanical multiplication occasioned by the use of a rack and pinion depends upon the diameter of the pinion. The smaller the pinion the greater the pressure that can be applied to the fruit for a given force applied to the handle. The amount of rotation of the pinion required to move the rack a given distance increases with a decrease in the size of the pinion. Since the expressing of the fruit is usually done in a cup-like construction, it is necessary to translate the movable part a sufficient distance to permit the insertion of the piece of fruit into the cup-like construction and then reverse the direction of movement after the fruit is in place. Thus, the movable part is moved away from the fixed part, the fruit inserted, the movable part moved towards the fixed part and then pressed against the fruit. While the movable part is moving towards the fruit and prior to engaging same, no work is being done, other than required to move the movable part. Since the usual axis of movement is vertical, this work, being aided by gravity, is inconsequential. When the fruit is reached, however, the movable part is required to exert considerable pressure.

Considering that great pressure is needed during extraction, if the pinion is made small, that part of the stroke during which no work is done, which can be termed the idle part of the stroke, requires rotating the pinion shaft by means of the handle a considerable amount causing considerable waste of time and effort. To alleviate this objection, the pinion can be increased in size, but only with a loss of efficiency, requiring the operator to exert great pressure when the movable part reaches the fruit. This places strain on the parts of the device and tires the operator.

Many constructions heretofore have been devised for the solution of this problem by means of disconnecting the handle or the pinion from the rack while the idle portion of the stroke is being accomplished. This has necessitated the use of clutches and other expensive and complicated disconnecting devices besides requiring the operator to achieve a certain degree of skill in the efficient operation of the device. Certain other constructions have provided for the operator pushing the rack against the fruit while permitting the pinion to spin with the handle. This expedient requires the rack to have an exposed part to enable the operator to grasp same. Moreover, the spinning of the handle is dangerous and the number of operations required to express the juice from a piece of fruit is increased from those required only by the use of a simple rack and pinion device.

One of the objects of my invention is to eliminate each and every difficulty heretofore experienced with fruit juice extractors of the character described, as set forth above.

A principal object of the invention is to provide a fruit juice extractor of the character described wherein the mechanism for moving the movable part against the stationary part consists of a simple rack and pinion mechanism, the pinion of which is arranged to be rotated by a conventional handle, but which mechanism is so constructed that for any given constant speed of rotation of the pinion the rack will slide at a variable speed and have a potential pressure available for squeezing the fruit which varies in an inverse ratio with the speed of movement of the rack whereby the idle portion of the stroke is accomplished at high speed and with low leverage amplification and the working part of the stroke is accomplished at low speed but with high leverage amplification, enabling great pressure to be exerted against the fruit.

Another object of the invention is to provide a novel rack and pinion mechanism in a fruit juice extractor which will be extremely simple in construction and economical to manufacture.

Other objects of the invention are to provide many important advantages enabled by the construction of the fruit juice extractor herein described, including: single stroke operation; novelty of formation of the parts of the mechanism; decrease in weight, size, and cost when compared with prior fruit juice extractors; and, extreme ease and efficiency of operation.

In the detailed description which follows certain other objects and advantages will become apparent while a preferred embodiment is described, but it is desired to point out that the particular description is only illustrative, and not intended to confine the invention.

To enable clear understanding of the invention I have illustrated the preferred embodiment in detail in the drawings in which the same characters of reference are employed to indicate corresponding or similar parts throughout the several figures of the drawings:

Fig. 2 is a detailed elevational view of rack and pinion mechanism of the fruit juice extractor.

Fig. 3 is a fragmentary front elevational view of the fruit juice extractor with portions shown in section to illustrate certain details of construction.

Fig. 4 is a sectional view taken through one of the columns of the fruit juice extractor on the line 4—4 of Fig. 1 and looking in the direction of the arrows.

Figure 1:
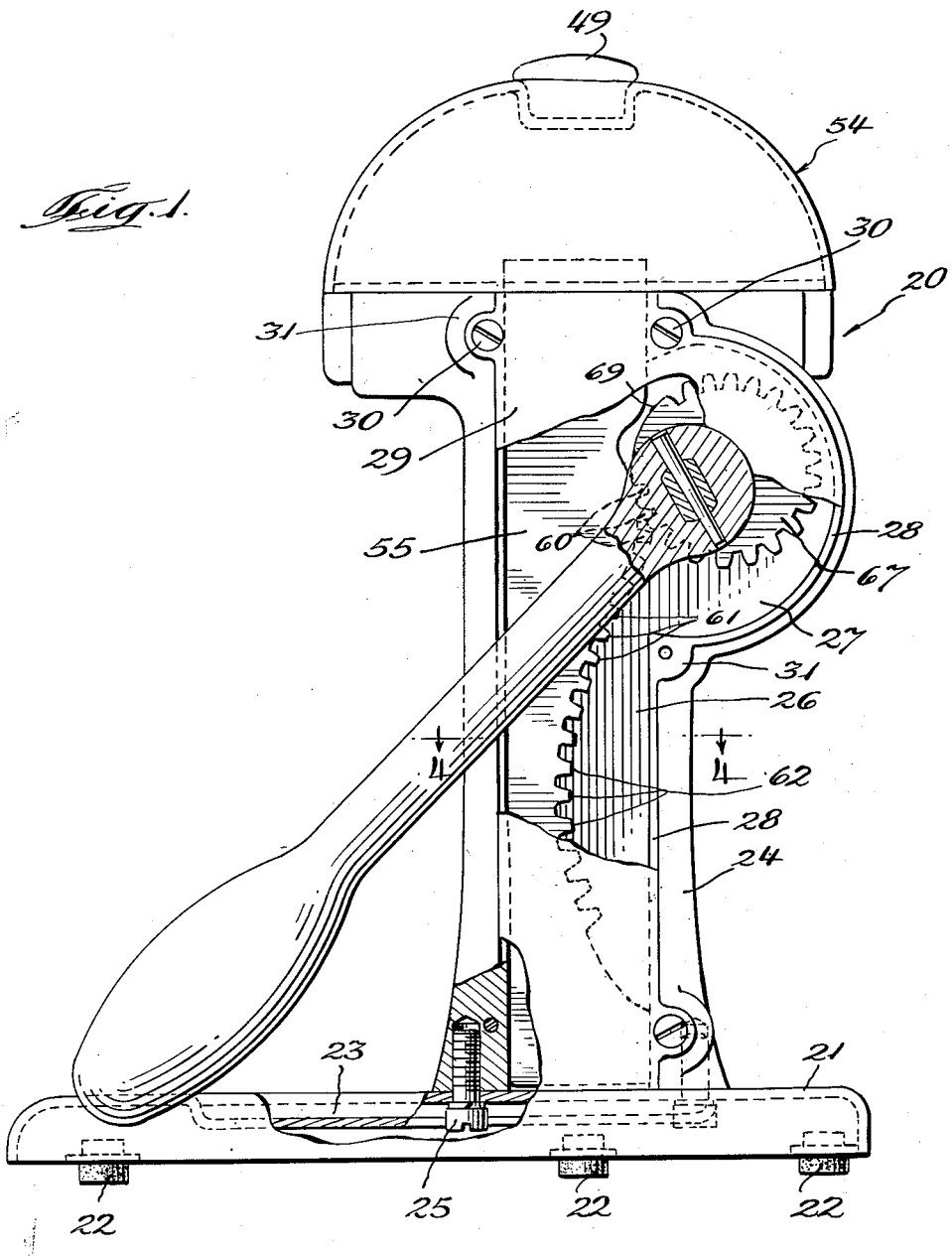
Fig. 1 is a side elevational view of a fruit juice extractor constructed in accordance with the principles of my invention, portions of the extractor being broken away and portions being shown in section clearly to illustrate the constructional details thereof.

Generally the invention consists of a construction wherein the movable part of the fruit juice extractor is secured on the end of a sliding rack whereby the movement of the rack will carry the movable part against the fruit which is disposed upon the stationary part, the rack having teeth formed therein with conventional profile, but the pitch of which varies, being of generally S or ogee form, and having a conventional pinion gear enmeshed therewith, but said pinion being eccentrically mounted and adapted to be rotated with its shaft by an appropriate handle secured to said shaft.

As previously explained, the idle portion of the stroke of the movable part is accomplished without any work being done and hence there is no great need for mechanical multiplication of the leverage exerted by the handle. There is, however, need for speed, and the desire to move the movable part a great distance with minimum rotation of the handle. Accordingly, at this stage of operation, illustrated in Fig. 2, the distance from the center of rotation of the pinion to the pitch line is the greatest, giving the greatest speed of movement of the rack with little rotation of the handle being required. The ratio of the moment arms for producing pressure along the axis of movement of the rack is least over the area of the pinion which engages the rack for approximately a third of the circumference of the pinion.

Presuming that the handle has been rotated, the portion of the pinion closer to the center of rotation thereof now commences to mesh with the rack teeth, while the movable part begins to squeeze the fruit. Since the moment ratio is now greatly increased, considerable pressure can be exerted by means of the handle without great effort on the part of the operator. Obviously, at this part of the stroke, during which greatest pressure against the fruit is desired, the movable part moves relatively slow, for the same rate of rotation of the handle.

Referring now to the drawings, I have illustrated a fruit juice extractor 20 which comprises a base 21 having the feet 22 and providing in the center thereof a shallow cavity 23 within which a container for the extracted juice is adapted to be disposed. On the opposite sides thereof there are provided a pair of substantially rectangular columns 24 secured to the base 21 by the screws 25. The columns 24 are provided with rectangular cavities 26 throughout their extent and have a connecting substantially hemispherical cavity 27 at the top thereof. The outer sides or faces of the columns 24 are open, exposing these cavities 26 and 27, and are provided with slight shoulders 28 whereby face plates 29 may be secured to said columns by screws 30 thereby enclosing the cavities. Suitable bosses 31 are provided for the reception of the screws 30. The plates 29 are similar except that they are reversed right and left, and the right hand plate is provided with a suitable opening for the boss which is formed on the face of the right hand gear 67, to be described.

As will be noted from Fig. 3, the columns 24 are spaced apart and connected at their upper ends by means of a hollow tube 33 preferably integrally formed therewith. A pinion shaft 34 is journalled in bushings 35 at opposite ends thereof said bushings being engaged within bored seats 36 provided at the ends of the hollow cavity 37 formed in the tube 33. The ends of the pinion shaft 34 are formed in a manner to be described.

The columns 24 are provided with integrally formed supporting arms 38 spaced below the upper ends 39 of the columns 24 said arms being in the form of semi-circular shelves of angular cross section facing one another across the space intervening between the columns. These arms 38 are adapted to support a drainage cup 39 thereon, with the upstanding flange 40 of the cup fitting the contour of the vertical walls of the arms 38, and a drain spout 41 depending from the cup in the center of the extractor 20 and forward of the tube 33 in order to drain juice entrapped in the cup. The cup 39 carries a reamer 42 therein which may be of any suitable construction, capable of aiding in the extraction of fruit juice and causing same to drain off, such as for example by the slots 43.

The fruit is adapted to be disposed upon the reamer 42 and have the pressure cup forced downwardly upon the fruit, squeezing same between the convex portion of the reamer 42 and the concave portion of the pressure cup 44 in a well-known manner. The pressure cup 44 is consequentially adapted to be elevated from the position shown in Figs. 1 and 3 to the position shown in Fig. 2 prior to the disposing of a piece of fruit upon the reamer 42. The pressure cup is secured within the movable cover 45 by means of a screw 46 which passes through the upper end 47 of the cup 44 and the base of a cylindrical cavity 48 formed in the cover 45 and is engaged by the nut 49. Since the cup 44 should be removable for enabling cleaning of the same, the nut 49 is in the form of a knob. It will be noted that the flange 50 of the pressure cup must extend downwardly a sufficient amount to engage the flange 51 of the reamer 42 (when no fruit is in place) in order that the pressure exerted on the fruit be evenly distributed, and hence the lower edge of said flange 50 is spaced below the lower edge 52 of the cover member 45. The intervening space is occupied by a skirt 53 which serves as a retainer for the pressure cup 44 and against which the lower edge of the flange 50 may be drawn in assembling the head 54 of the device 20. For explanatory purposes, the head will be defined as the assembly of cover 45, pressure cup 44, retainer 53, and the securing means.

I have thus far described the structure of the device 20 without reference to the means for moving the head 54 up and down in order to cause engagement between the pressure cup 44 and the reamer 42. It will be manifest from the part of the description which follows that the means for moving the head is the vital part of my invention since it is by the means so described that I am able to achieve the many advantages and objects of my invention previously pointed out. In the construction described I illustrate and refer to two racks adapted to be attached on opposite sides of the head 54 so that the resultant of pressure applied thereby will be in the center of the device. Other advantages engendered by this construction, namely—using two tension members instead of one, are set forth in my copending application Ser. No. 756,686 filed June 24, 1947, now Patent Number 2,526,253, patented October 17, 1950, for Fruit Juice Extractor, but it is specifically desired to point out that the instant invention is not limited to a two column extractor. The mechanism described and claimed herein is capable of being used in any single column type of extractor with the accrual of all advantages enumerated in connection with this specification.

At each side of the head 54 there is attached a downwardly depending member 55 which will hereinafter be termed a rack. Each rack 55 is of generally rectangular cross section as shown in Fig. 4 and adapted snugly to engage and slide within the cavities 26 of the columns 24, with the left edge 56 of each, as viewed in Fig. 2 engaging the left hand edge 57 of the cavities 26 and bearing thereagainst. The upper ends of the racks 55 are secured to the head in any desirable manner such as by welding, or the like. In the illustrated embodiment, the upper ends are provided with lugs 58 engaging in appropriate openings in the edge of the pressure cup retainer 53 and bent over thereupon.

The right hand edge of each rack 55 is provided with a toothed formation 59 of peculiar construction. The laws of forming said teeth 59 need not be other than conventional, but the pitch thereof must follow a novel path. It will be noted that the pitch of the gear teeth 59 is in the form of a reverse curve, or S which gives rise to the teeth indicated at 60 being similar to those formed on an ordinary, externally toothed spur gear; the teeth indicated at 61 being generally similar to those found on a rack; and the teeth indicated at 62 being similar to those formed on an internally toothed gear. The explanation above given is only illustrative, since the pitch radius of the toothed formation varies throughout its entire extent, there being no portion where adjacent gear teeth are of the identical kinematic construction.

On each end of the shaft 34 there is provided a flat portion, the left hand end being indicated at 63 and the right hand end being indicated at 64. The right hand end 64 extends outwardly of the cavity 27 and has the end 65 of the handle 66 pinned thereto whereby the pinion shaft 34 may be rotated by swinging said handle 66. Each flat portion 63 and 64 carries a conventional spur gear 67 secured thereto within the respective cavities 27 and arranged in the same plane as the racks 55, with the teeth thereof engaging the teeth 59. It will be seen that the spur gears are eccentrically mounted on the shafts 34 so that the true center of the gears 67 will oscillate to the right and left of the axis of rotation 68 of said gears. The pitch line of the gear teeth 59 heretofore described is but a development of the pitch line of the gears 67 described on a member translated past the gears 67 perpendicular to the axis of rotation 68.

It will be seen therefore, that if the gears 67 and racks 55 are assembled as shown in the drawings, with the gears engaging the teeth 62 while the head 54 is at the upper extent of its movement, then as the handle 66 is rotated in a counterclockwise direction as viewed in Fig. 2 as the teeth 62 are engaged, the distance from the axis 68 to the point of engagement being greatest the racks 55 will move downwardly at a greater speed for any given rate of rotation of the handle 66 than if other of the teeth 59 were engaged. In other words, a small amount of rotation of the handle 66 will result in a greater extent of translation of the rack 55 than if the teeth 60 or 61 were engaged. When the teeth 60 are engaged, the distance from the axis of rotation to the point of engagement of the teeth 59 is the least (see Fig. 1) and hence, for the same degree of rotation used while the gears 67 were engaged at 62, the racks 55 will be translated a comparatively lesser distance.

It will also be obvious from the above, that the mechanical amplification of the pressure or force applied to the handle 66 being determined by the ratio of the handle moment to the moment measured from the axis 68 to the point of engagement of the teeth, the amount of pressure which can be applied by the head will be greatest when the teeth 60 are engaged, or at the bottom of the stroke, when the cup 44 engages against the fruit disposed on the reamer 42. At the beginning of the stroke, which is the idle portion, no work is done, and hence the loss of mechanical amplification is immaterial.

The structure described makes it possible to eliminate the necessity of turning the handle 66 more than one revolution. To that end, in the embodiment shown, the handle is intended to rotate approximately 270°, there being provided a blank portion 69 on each gear for cooperating with stops 70 on racks 55 limiting extent of upward travel of the racks. The pressure available when squeezing the fruit by means of my invention is equivalent to that exerted by a conventional rack and pinion arrangement in which the radius of the pinion is equal to the distance from the axis of rotation 68 to the point of contact with teeth 60 when the head is in the position shown in Fig. 1. Under these conditions, i. e. with such a small pinion, it would be necessary to rotate the handle 66 at least a few revolutions to complete one stroke of the head in conventional rack and pinion structures. Likewise, in order to obtain the accelerated movement of the head when the teeth 62 are engaged, a conventional rack and pinion arrangement would require the operator to apply at least a few times more pressure than required with my novel construction.

I do not intend to be limited to the gear arrangement described herein. It is not essential that the gears 67 be conventional spur gears eccentrically mounted and that the teeth 59 be formed by developing the pitch line of the gears 67 along the rack 55. Any suitable manner of achieving the described action by a modified rack and pinion structure is believed to come within the scope of my invention. The pinion and rack need only be formed so that the distance from the point of engagement of the gear teeth to the axis of rotation when measured perpendicular to the line of translation vary to provide a large movement and low mechanical amplification during the idle portion of the stroke and small movement and high mechanical amplification during the working part of the stroke.

It is preferable although not required that the racks 55 together with the toothed formation 59 thereof be formed by stamping same from sheet metal blanks. This provides a highly economical method of producing the mechanism of the device. The gears 67 could also be stamped from metal blanks. Such fabrication methods eliminate the need for expensive machinery to hob or machine the rack and pinion portions of my device. The development of the profiles need not require mathematical calculations but instead may be evolved empirically, or by trial and error. Various combinations of gear profiles may be combined to obtain the desired construction.

Further explanation should not be necessary to those skilled in the art, it also being obvious that the details of the invention are capable of wide variation without departing from the spirit of the invention as defined in the appended claims.

What I claim and desire to secure by Letters Patent of the United States is:

1. In a juice extractor of the character described, which includes a fruit supporting member having means therein to permit the juice to be drained from the member, and a movable member adapted to be moved relative to the supporting member for expressing juice from a fruit supported in the latter member, a base having thereon a pair of columns, each having an elongate rack slideway therein, a rack disposed in each slideway and adapted to be reciprocated therein, each rack having teeth positioned in reverse curves along one edge thereof, said columns having cavities at one side thereof opposite said teeth, operating mechanism including a rotatable shaft and an actuating handle, said shaft having portions thereof located in the respective cavities, gears eccentrically mounted on said shaft and having portions thereof disposed within the respective cavities in one stage of rotation of the shaft, and in another stage of rotation of the shaft having a portion of the teeth of said gears disposed outside of the respective cavities, all of said gear teeth being adapted to engage the teeth of the respective racks.

2. An operating mechanism for a fruit juicer of the type having a base, a pair of standards thereon, a fruit supporting member rigidly mounted on the top of said standards, and a head slidably associated with the standards for cooperation with the fruit supporting member to compress the fruit and express the juice, said operating mechanism comprising racks having teeth positioned in reverse curves along one edge thereof, said standards having cavities at one side thereof opposite said teeth and located adjacent the upper ends of the standards, a rotatable shaft extending transversely through the standards and having portions thereof located in the respective cavities, gears eccentrically mounted on said shaft and having portions thereof in one stage of the rotation of the shaft disposed within the respective cavities and in another stage of rotation of the shaft having a portion of the teeth of the gears disposed outside of the respective cavities, all said gear teeth being adapted to engage the teeth of the respective racks, and an actuating handle on one end of the shaft.

JACOB JUD MITNICK.

References Cited in the file of this patent

UNITED STATES PATENTS

| Number | Name | Date |
| --- | --- | --- |
| D. 144,481 | Casanov | Apr. 23, 1946 |
| 22,216 | Barnes | Nov. 30, 1858 |
| 409,961 | Goodenough | Aug. 27, 1889 |
| 604,324 | Holmgreen | May 17, 1898 |
| 752,884 | Carmichael | Feb. 23, 1904 |
| 1,164,992 | Cookson | Dec. 21, 1915 |
| 1,267,492 | Young | May 28, 1918 |
| 1,459,650 | Burnett | June 19, 1923 |
| 2,142,975 | Majewski | Jan. 3, 1939 |
| 2,306,884 | Jakovicz | Dec. 29, 1942 |
| 2,413,866 | Du Laney | Jan. 7, 1947 |
| 2,474,399 | Johnson | June 28, 1949 |
| 2,572,286 | Smith | Oct. 23, 1951 |
| 2,591,311 | Springford | Apr. 1, 1952 |